United States Patent [19]

Clayton, IV

[11] Patent Number: 4,476,527
[45] Date of Patent: Oct. 9, 1984

[54] SYNCHRONOUS DATA BUS WITH AUTOMATICALLY VARIABLE DATA RATE

[75] Inventor: John B. Clayton, IV, Northboro, Mass.

[73] Assignee: Data General Corporation, Westborough, Mass.

[21] Appl. No.: 329,489

[22] Filed: Dec. 10, 1981

[51] Int. Cl.³ .............................................. G06F 3/00
[52] U.S. Cl. .................................................... 364/200
[58] Field of Search .............................. 364/200, 900

[56] References Cited

U.S. PATENT DOCUMENTS

| | | | |
|---|---|---|---|
| 3,633,169 | 1/1972 | Bickford | 364/200 |
| 3,798,613 | 3/1974 | Edstrom et al. | 364/200 |
| 3,909,799 | 9/1975 | Recks et al. | 364/200 |
| 3,970,997 | 7/1976 | Daly et al. | 364/200 |
| 3,993,981 | 11/1976 | Cassarino, Jr. et al. | 364/200 |
| 4,041,473 | 8/1977 | Bardotti et al. | 364/200 |
| 4,189,769 | 2/1980 | Cook et al. | 364/200 |
| 4,246,637 | 1/1981 | Brown et al. | 364/200 |
| 4,363,094 | 12/1982 | Kaul et al. | 364/200 |
| 4,378,588 | 3/1983 | Katzman | 364/200 |

Primary Examiner—Gareth D. Shaw
Assistant Examiner—Jameson Lee
Attorney, Agent, or Firm—Gerald J. Cechony; Joel Wall

[57] ABSTRACT

A digital data bus system operating asynchronously with a fixed clock and having a automatically variable data rate selected by sending and receiving units. A master clock is generated by a master controller and distributed to one or more peripheral controllers of the data bus system through a single clock line. In addition to address/data lines, a single handshake hold signal is shared by the master and all peripheral controllers. All data transfers are executed on a bus clock pulse and data transfer rate is controlled by the sending and receiving units through operation of the hold signal. A receiving unit not ready to receive information on the bus will assert hold signal on hold signal line and the transmitting unit will maintain the information presently on the bus during each clock period in of which hold signal is asserted. Data transfer is executed on next clock pulse after termination of hold signal. All information transfers are thereby synchronous with the single frequency bus clock, but data transfer rate is variable and automatically determined by the sending and receiving units.

6 Claims, 4 Drawing Figures

FIG 1 DATA PROCESSING SYSTEM

SYNCHRONOUS DATA BUS WITH AUTOMATICALLY VARIABLE DATA RATE

BACKGROUND OF THE INVENTION

1. Field of the Invention

This invention relates to a bus system for data transmission and, more particularly, to a digital data bus for communication within a digital data processing system.

2. Description of Prior Art

Digital data buses are used in data processing systems, for example, for communication of digital data between a data processor and one or more peripheral devices, such as disc drive memories, terminals, or other data processing units. In general, data buses used in such systems are either synchronous, wherein data transfer is performed in synchronization with a clock signal, or are asychronous, wherein handshake signals synchronize the sending and receiving units.

In a synchronous data bus system, all data transfers are performed in synchronization with a clock signal. That is, the operation of the sending and receiving units is synchronized to the clock. Such systems may utilize either a single frequency clock, or a multiple or variable frequency clock. A single frequency clock system allows the use of simple clock circuitry but data transmission rate, and thus operation of the overall system, is limited to the data rate of the slowest device in the data processing system. In a multiple or variable clock rate system, clock rate is selected to be that of the slower of the sending or receiving units currently communicating. Data rate may, however, be selected to be the highest achievable with the particular units which are communicating. A multiple or variable data rate synchronous system is, in general, more complex than a single clock rate system since the clock circuitry must be capable of generating a multiplicity of clock frequencies. Also, before data communication can be performed the sending and receiving units must communicate to select a clock rate.

In an asynchronous data bus system, as stated above, transfer of data between a sending and a receiving unit is synchronized by handshake signals. That is, a sending unit places data on the bus and transmits a handshake signal to the receiving unit indicating that data is present on the bus. When the receiving unit is ready to accept the data, the receiving unit accepts the data and transmits a handshake signal to the sending unit indicating that the data has been accepted. An asynchronous data bus system thereby allows greater flexibility of data rate and the data rate may be the maximum achievable between a particular sending and receiving unit pair. An asynchronous data bus system is in general, however, more complex than a synchronous system due to the requirement to exchange handshake signals between sending and receiving units. In addition, maximum data rate may not be achievable due to the requirement to resynchronize the data transferred at the sending and receiving units. That is, data must first be transferred from, for example, a disc drive, to a sending unit, then from sending unit to receiving unit, and finally from receiving unit to, for example, a data processor. Additional delays in data transmission will thereby be imposed at the sending end of the bus in transferring data from the peripheral device to the sending unit, and from the sending unit to the bus. This delay occurs because data transfer between the peripheral device and the sending unit is not synchronized with transfer of data from the sending unit to the data bus. Similarly, additional data transmission delays may be imposed at the receiving end because reception of data by the receiving unit is not synchronized with transfer of data between the receiving unit and the data processor.

The present invention provides a solution to these problems of the prior art as will be discussed in detail hereinbelow.

SUMMARY OF THE INVENTION

The present invention relates to a digital data bus system operating synchronously with a fixed clock rate and having a variable data rate selected by the sending and receiving units. A master controller is located, for example, at a data processor. A peripheral controller is located at each other unit, or peripheral device, of the data processing system. Peripheral devices may include, for example, processors, disc drive memories, intelligent terminals, or further data transmission links. The master controller and all peripheral controllers are interconnected through a bus. The master and peripheral controllers comprise the interfaces between, respectively, the data processor and peripheral devices and the bus. A fixed frequency clock is generated by the master controller and is distributed to all peripheral controllers through a single clock line. In addition to address/data lines, the bus includes a single handshake signal line, referred to as the Hold line, shared by the master and peripheral controllers. All data transfers are executed on a clock pulse but data transfer rate is controlled by the particular sending and receiving units. A sending unit will place information, for example, an address or data, on the bus in synchronization with the clock. If the receiving unit is ready to receive that information, the information will be transferred into the receiving unit on the same clock pulse. If the receiving unit is not ready to receive the information on the bus, the receiving unit will assert a Hold signal on the Hold line. The sending unit responds to a Hold signal by maintaining the information to be transferred on the bus for each clock period in which Hold signal is asserted. When the receiving unit is ready to receive the information, Hold signal is terminated and the information transferred on the next clock pulse. Thus, all information transfers are synchronous with the single frequency, fixed period clock. Actual rate of data transfer, however, is variable and automatically determined by the particular sending and receiving units so as to occur at the maximum rate achievable by the particular pair of sending and receiving units.

It is thus advantageous to incorporate the present invention into a digital data bus system because the data bus system allows data transfers between two system units to be automatically performed at the maximum rate achievable by any two system units. It further advantageous to incorporate the present invention into a data bus system because all data transfers are performed synchronously with the data bus clock, thereby enhancing speed of data transfer by not requiring resynchronization of data at the sending and receiving units. It is still further advantageous to incorporate the present invention into a data bus system as the present invention allows the above advantages with a minimum of hardware complexity.

It is thus an object of present invention to provide an improved data bus system.

It is another object of the present invention to provide an improved data bus system having an automatically variable data transfer rate.

It is yet another object of the present invention to provide an improved data bus system having an automatically variable data transfer rate wherein all data transfers are executed synchronously with a single, fixed rate clock.

Other objects and advantages of the present will be understood by those of ordinary skill in the art, after referring to detailed description of the preferred embodiments and drawings herein.

DESCRIPTION OF THE PREFERRED EMBODIMENTS

The structure and operation of a data processing system including a digital data bus employing a preferred embodiment of the present invention is presented first, followed by a more detailed description of the structure and operation of the bus system.

1. DATA PROCESSING SYSTEM (FIG. 1)

Figure 1:
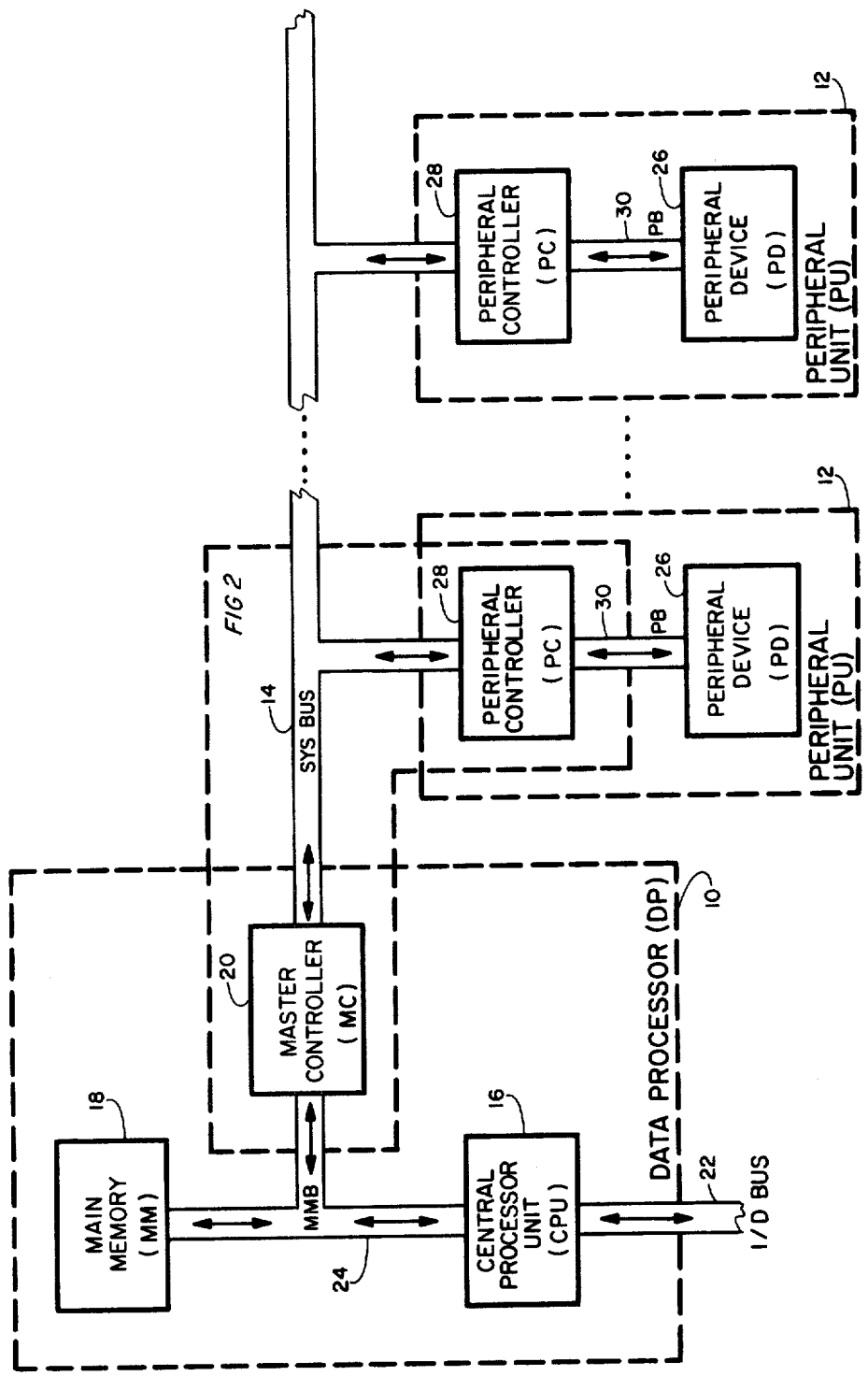
FIG. 1 is a block diagram of a data processing system including a data bus system.

Referring to FIG. 1, a block diagram of a data processing system including a bus system incorporating the present invention is shown. Major elements of the data processing system are Data Processor (DP) 10, one or more Peripheral Units (PUs) 12, and System Bus (SYSBUS) 14 which interconnects DP 10 and all PUs 12.

DP 10 includes, for example, a Central Processing Unit (CPU) 16, a Main Memory (MM) 18, and a Bus System Master Controller (MC) 20. CPU 16 may have a bi-directional interface to external devices, such as an operator's terminal, through Input/Output (I/O) Bus 22. CPU 16 and MM 18 are interconnected through bi-directional Main Memory Bus (MMB) 24, and MC 20 has bi-directional connections between MMB 24 and SYSBUS 14.

Referring to a PU 12, each PU 12 includes a Peripheral Device (PD) 26 and Peripheral Controller (PC) 28 which are interconnected through bi-directional Peripheral Bus (PB) 30. Each PC 28 has a bi-directional input and output connected to SYSBUS 14.

The bus system of the present invention is comprised of SYSBUS 14, an MC 20, and one or more PCs 28.

Referring again to DP 10, in general, data processing operations are performed by CPU 16 upon data stored in MM 18 and under direction of instructions stored in MM 18. There are two paths by which data and instructions may be written into and read out of MM 18. The first path is through I/O Bus 22, CPU 16, and MMB 24. The second path is from PUs 12 through SYSBUS 14, MC 20, and MMB 24. In general, the path through I/O Bus 22 may be utilized for lower speed data transfers, such as between DP 10 and an operator terminal. The path through SYSBUS 14 may be utilized for high speed data transfers directly into or out of MM 18. In this respect, PDs 26 may include such devices as high speed disc drive memories, other CPUs, intelligent terminals, or interfaces to yet further data processing systems. In general, data or instructions may be transferred directly from a PD 26 to MM 18 through SYSBUS 14 and MC 20, read from MM 18 to CPU 16 through MMB 24, and operated upon by CPU 16. The results of these operations may then be read from CPU 16 to MM 18 through MMB 24, and, finally, the results read directly from MM 18 to a PD 26 through MC 20 and SYSBUS 14.

Having described the overall structure and operation of a data processing system incorporating a bus system of the present invention, the bus system comprising MC 20, SYSBUS 14, and one or more PCs 28 will be described in further detail next below.

2. BUS SYSTEM (FIGS. 2, 2A, 3)

Figure 2:
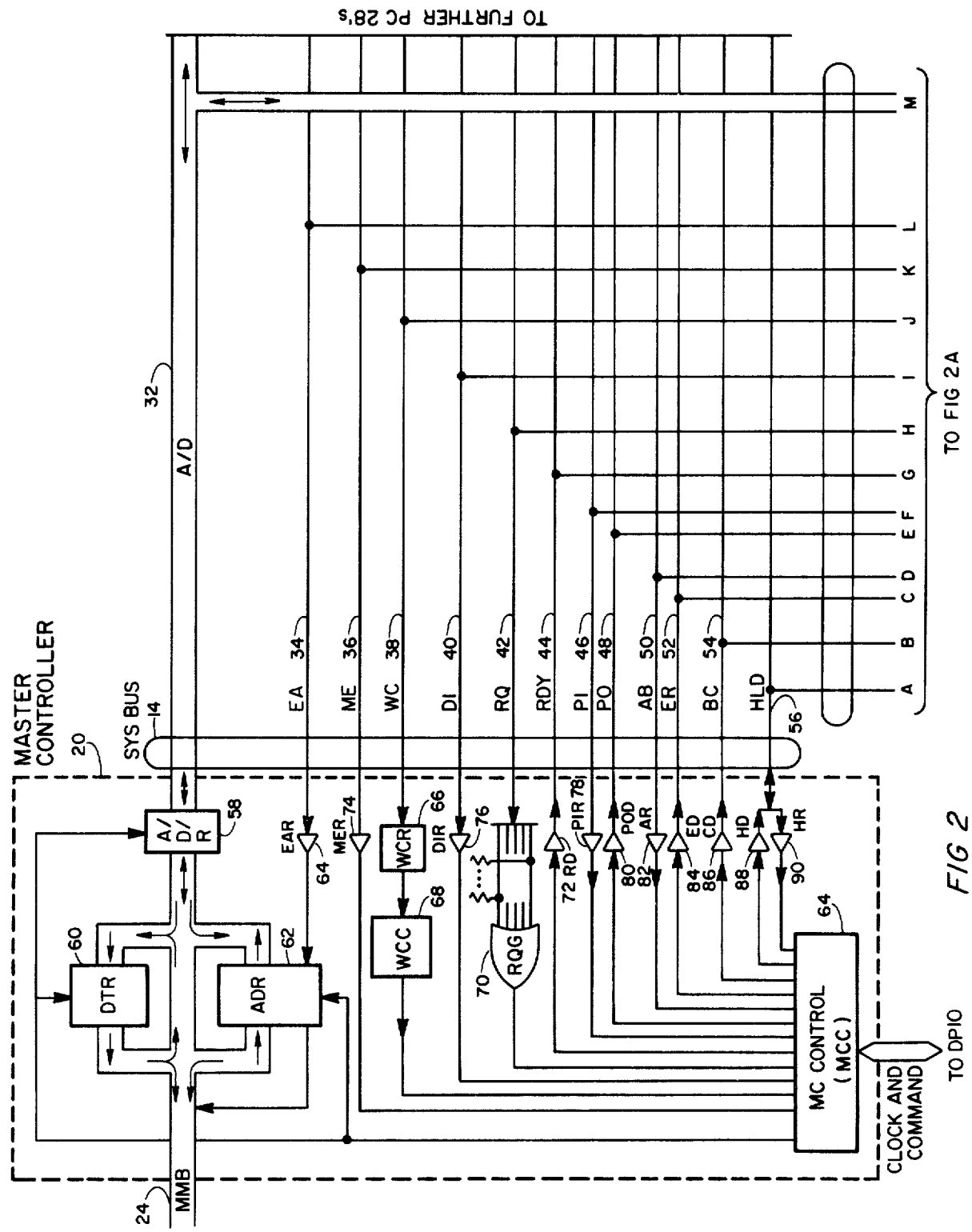
FIGS. 2 and 2A are a block diagram of the data bus system shown in FIG. 1.
Figure 2A:
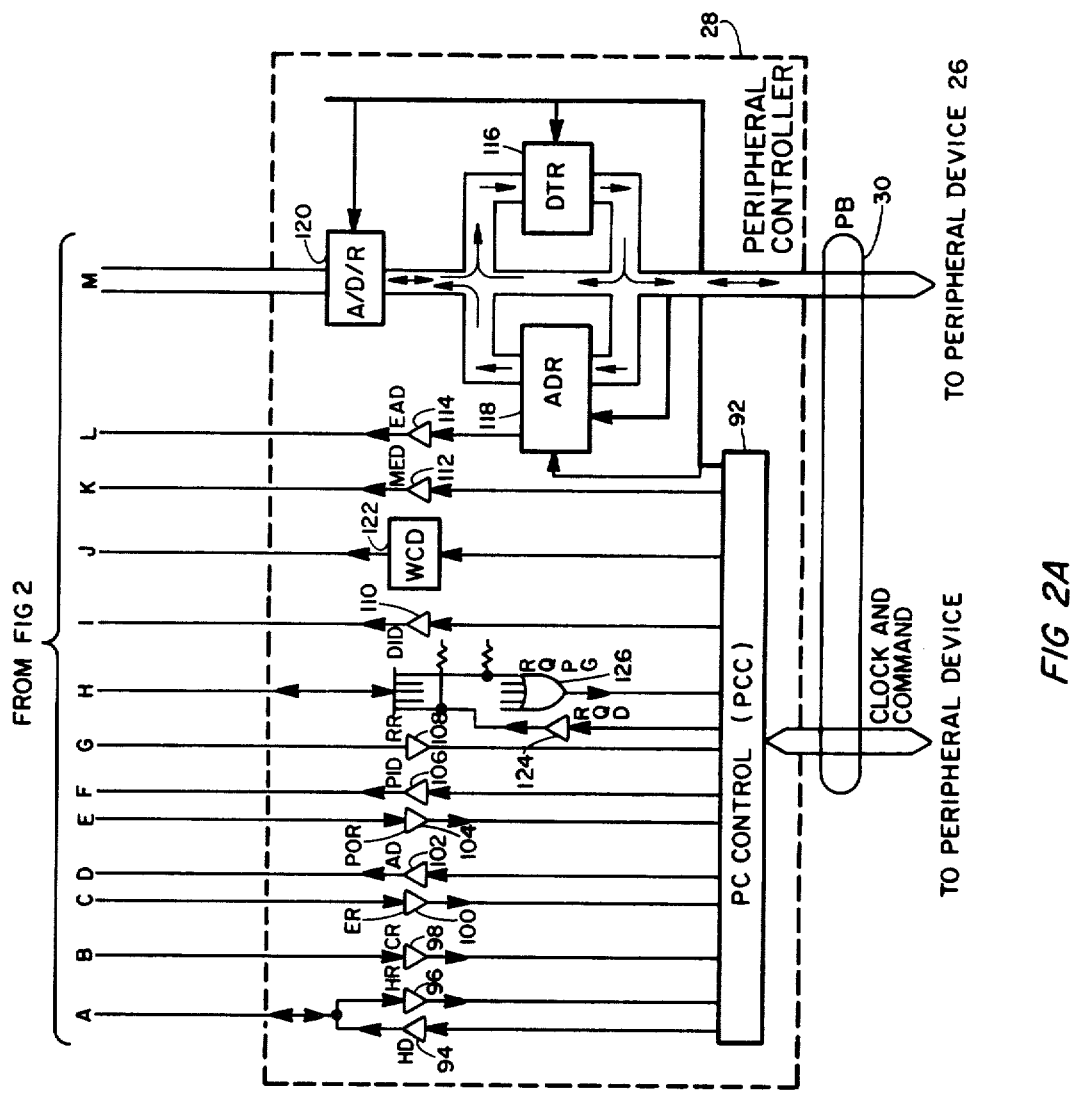

Referring to FIGS. 2 and 2A, these figures may be joined to provide a block diagram of a bus system of the present invention. As stated above, such a bus system includes an MC 20, a SYSBUS 14, and one or more PCs 28.

a. SYSTEM BUS 14 (FIGS. 2 2A)

As shown in FIGS. 2 and 2A, SYSBUS 14 includes Address/Data lines 32 and clock and control lines. Each of these lines, and the signals appearing on these lines, will be described individually below, followed by descriptions of MC 20 and PC 28, and finally by a description of certain features of bus system operation.

Referring to the address/data and clock and control lines of SYSBUS 14:

(a) Address/Data (A/D) lines 32 are bi-directional and conduct both addresses and data. As will be described further below, a data transfer is initiated by a control word unidirectionally provided to MC 20 by a PC 28. A control word will include an address specifying a location in MM 18 in which data is to be written or from which data is to be read. After the control word has been transferred, A/D lines 32 are bi-directionally used to conduct data words between MC 20 and a PC 28. In a present embodiment of the bus system, all data words transferred are 16 bits in width. A/D lines 32 include 16 individual lines, so that a full data word may be transferred over A/D lines 32 in a single operation. Addresses, however, may be greater than 16 bits, and, in this case, A/D lines 32 may be used to conduct the lower 16 bits of address.

(b) Referring to Extended Address (EA) lines 34, in those systems wherein MM 18 addresses are greater than 16 bits, EA lines 34 are utilized to conduct additional address bits. In a present embodiment of the bus system, EA lines 34 are 4 lines wide so that a PC 28 may use up to a 20 bit address in identifying a location in MM 18.

(c) Referring to Map Enable (ME) line 36, the entire address space of MM 18 may be greater than that which is addressable directly by a PC 28, or it may be desirable to assign a separate portion of MM 18's address space to each PD 26 of the data processing system. In such cases, address mapping is performed, that is, addresses provided by PC 28 are translated into corresponding addresses in MM 18. When mapping is to be performed, a Map Enable (ME) signal is provided to MC 20 on ME line 36 by the PC 28 initiating data transfer.

(d) Referring to Word Count (WC) lines 38, data transfers between a PC 28 and MM 18 may be comprised of more than one data word. In such cases, the control word provided to MC 20 by a PC 28 to initiate a multi-word data transfer includes a Word Count Number (WCN) which specifies the number of data words to be transferred. The address provided on A/D lines 32 as part of that control word specifies the location in MM 18 of the first data word of the sequence of data words to be transferred. In a present embodiment of the bus system, a WCN is an eight bit number and WC lines 38 is comprised of eight lines. In the present embodiment the WCN specifies the number of words to be transferred minus one; for example, a WCN of zero thereby indicates that one data word is to be transferred, and a WCN of 8 indicates that nine data words are to be transferred. This convention allows the eight bit WCN to specify a data transfer of up to 256 data words.

(e) Referring to Data In (DI) line 40, a PC 28 initiating a data transfer provides a Data In (DI) signal to MC 20 as part of the control word initiating the data transfer. The DI signal indicates whether data is to be transferred from that PC 28's associated PD 26 to MM 18, or from MM 18 to the associated PD 26.

(f) Request (RQ) lines 42 include a separate request line for each PC 28 and associated PD 26 of the data processing system. Each PC 28 has an output connected to its corresponding request line and inputs connected from all request lines of RQ lines 42. MC 20 has inputs connected from all request lines of RQ lines 42. Whenever a particular PD 26 requires access to MM 18, the associated PC 28 generates a Request (RQ) signal upon its associated request line. As described further below, MC 20 and the individual PCs 28 respond to RQ signals on RQ lines 42 by granting access to MM 18 to the PD 26 having highest priority. In a present embodiment of the bus system, RQ lines 42 includes eight individual request lines, so that up to eight PD 26's and associated PCs 28 may have access to MM 18 through the bus system.

(g) Ready (RDY) line 44 is single line connected from an output of MC 20 and to inputs of each PC 28 of the data processing system. Whenever MC 20 receives a RQ signal on any of RQ lines 42, and access to MM 18 may be granted to a requesting PD 26, MC 20 generates a Ready (RDY) signal on RDY line 44. The highest priority requesting PD 26 and associated PC 28 respond to a RDY signal by initiating a data transfer between that PD 26 and MM 18.

(h) Parity In (PI) line 46 and Parity Out (PO) line 48 are single direction, single lines for conducting parity signals, respectively, from PCs 28 to MC 20 and from MC 20 to PCs 28. These parity signals are provided for error detection upon each transmission, respectively, of a data or control word from a PC 28 to MC 20 or of a data word from MC 20 to a PC 28.

(i) Abort (AB) line 50 is a single, single directional line connected from outputs of each PC 28 of the data processing system and to an input of MC 20. Any PD 26 and associated PC 28 currently executing a data transfer may terminate that transfer by asserting an Abort (AB) signal to MC 20 on AB line 50. MC 50 will respond to an AB signal input by terminating the data transfer.

(j) Error (ER) line 52 is a single, single directional line connected from an output of MC 20 and to an input of each PC 28. MC 20 will provide an Error (ER) signal on ER line 52 whenever a parity error is detected in a data or control word received by MC 20.

(k) Bus Clock (BC) line 54 is a single, single directional line connected from an output of MC 20 and to an input of each PC 28. BC line 54 conducts a bus clock from MC 20 to each PC 28 in the data processing system. As will be described further below, all data or control word transfers performed by the bus system are executed in synchronization with the bus clock signal.

(l) Hold line (HLD) 56 is a single, bi-directional line connected to an input and an output of MC 20 and of each PC 28. During any transfer of a control or data word, a receiving unit, MC 20 or a PC 28, may indicate that it is not yet ready to receive a word placed upon SYSBUS 14 by the sending unit by asserting a Hold (HLD) signal on HLD line 56. The sending unit will respond to a HLD signal by maintaining the word to be transferred on SYSBUS 14 for each bus clock period during which HLD signal is asserted.

b. MASTER CONTROLLER 20 (FIG. 2)

Referring to MC 20, connected between A/D lines 32 and MMB 24 are Address/Data Driver/Receiver (A/D/R) 58, Data Register (DTR) 60, and Address Register (ADR) 62. A/D/R 58 is, in the present embodiment, a 16 bit line driver and receiver. DTR 60 is a 16 bit register having inputs connected from and outputs connected to the bi-directional inputs/outputs of A/D/R 58 and to and from bi-directional MMB 24. ADR 62 is a 20 bit register having the inputs and outputs of 16 bits of register storage connected to and from the bi-directional input/outputs of A/D/R 58 and to and from MMB 24. The inputs of the remaining four bits of ADR 62 are connected from the four bit output of Extended Address Line Receiver (EAR) 64. EAR 64's four bit input is connected from EA lines 34. The outputs of the remaining four bits of ADR 62 are connected to MMB 24. Control inputs of A/D/R 58, DTR 60, and ADR 62 are connected from outputs of Master Controller Control (MCC) 64, which will be described further below.

Transmission paths for address and data words between MMB 24 and SYSBUS 14 through A/D/R 58, DTR 60, and ADR 62, and the transmission path of extended address bits from EA lines 34 to MMB 24 through EAR 64 and ADR 62, are indicated by arrows. As previously described, in the present embodiment the transmission of address words, which are a part of the control word preceding each data transmission, is unidirectional from a PC 28 to MC 20 and MM 18. The flow of data words, however, is bi-directional; that is, data words may be transmitted from a PC 28 to MC 20 and written into an MM 18 address indicated by the address word portion of a control word, or may be read from the MM 18 location indicated by the address word and transmitted from MC 20 to a PC 28.

First considering the transmission path of the address portions of control words, a 16 bit address and a 4 bit address placed on, respectively, A/D lines 32 and EA lines 34 by a PC 28 are received by A/D/R 58 and EAR 64. The 16 bits of address received from A/D lines 32 are then transferred, through MMB 24, to the inputs of ADR 62 and stored therein. The 4 bits of extended address received from EA lines 34 by EAR 64 are similarly transferred into and stored in ADR 62. Subsequently, the 20 bits of address stored in ADR 62 may be transferred onto MMB 24 to address a location in MM 18.

Data words appearing on A/D lines 32 will be received by A/D/R 58, transferred to the inputs of DTR 60, and stored in DTR 60 for subsequent transfer onto MMB 24. When data words are to be transferred from MM 18 to a PD 26, the data words are transferred from MM 18 through MMB 24 to the inputs of DTR 60 and stored therein. Data words are subsequently transferred from the outputs of DTR 60 to MMB 24 and subsequently through A/D/R 58 to A/D lines 32 to be received by a PC 28.

In alternate embodiments of the present invention, data words may be transferred directly between MMB 24 and A/D lines 32 through A/D/R 58 without intervening storage in DTR 60. In yet another alternate embodiment, EA lines 34, EAR 64, and ADR 62 may be constructed as a bi-directional transmission path, thereby allowing DP 10 to address PDs 26 so that the bus system of the present invention is fully bi-directional.

Referring next to Word Count Receiver (WCR) 66 and Word Count Counter (WCC) 68, as stated above WC lines 38 are, in the present embodiment, unidirectional from PCs 28 to MC 20. WCNs are received by WCR 66 and transferred into WCC 68 to be stored therein. The WCN output of WCC 68 is provided to inputs of MCC 64. As stated above and described further below, WCNs indicate the number of data words to be transferred during a single data transfer between MM 18 and a PD 26 and is provided to MC 20 as part of a control word initiating a data transfer. The address provided in the control word is then an initial, or starting, address identifying the location in MM 18 of the first data word to be transferred. As each data word is transferred from a PD 26 to MM 18, or from MM 18 to a PD 26, MCC 64 decrements the WCN stored in WCC 68 and correspondingly increments the initial address stored in ADR 62. ADR 62 will thereby provide to MM 18 a series of addresses indicating the locations in MM 18 of each of the data words to be transferred between MM 18 and a PD 26.

Referring to Request Gate (RQG) 70, RQG 70 is a multiple input line receiver having an input connected from each line of RQ lines 42. RQG 70 will generate an output to MCC 64 when a Request (RQ) signal from any PC 28 in the data processing system appears upon any line of RQ lines 42. As described further below, MCC 64 will respond to an output of RQG 70 by placing a Ready (RDY) signal on RDY line 44 through Ready Driver (RD) 72 when MM 18 is available for a data transfer.

The remaining elements of MC 20 are comprised of line drivers and receivers interfacing between MCC 64 and the remaining control and clock lines of SYSBUS 14. In this respect, Map Enable Receiver (MER) 74 and Data In Receiver (DIR) 76 are connected, respectively, from ME line 36 and DI line 40 to inputs of MCC 64. Parity In Receiver (PIR) 78 and Parity Out Driver (POD) 80 are connected, respectively, from PI line 46 to an input of MCC 64 and from an output of MCC 64 to PO line 48. Similarly, Abort Receiver (AR) 82 and Error Driver (ED) 84 are connected, respectively, from AB line 50 to an input of MCC 64 and from an output of MCC 64 to ER line 52. Bus clock output of MCC 64 is connected through Clock Driver (CD) 86 to BC line 54. Hold Driver (HD) 88 and Hold Receiver (HR) 90 are connected, respectively, from a hold output and a hold input of MCC 64 to single, bi-directional HLD line 56.

Referring finally to MCC 64, MCC 64 receives control signal inputs from PCs 28 through SYSBUS 14 and provides control signals in return to PCs 28 through SYSBUS 14 and to the elements of MC 20, such as DTR 60, ADR 62, and WCC 68. MCC 64 is also the control interface betwen MC 20 and DP 10 and coordinates the operation of the bus system with that of DP 10. For example, MCC 64 must coordinate data transfers between MM 18 and PDs 26 with CPU 16's requirements for access to MM 18, so that MM 18 access time is utilized most efficiently and conflicts between PDs 26 and CPU 16 are avoided.

The specific clock and command interface between MCC 64 and DP 10 is not described herein in detail as this interface will be determined by the particular configuration and operation of DP 10. For example, the bus system presented herein is synchronous in that all data transfers will occur in synchronization with Bus Clock signal provided on BC line 54 and it is preferrable that Bus Clock be synchronized with MM 18's internal clock and timing. In certain configurations of DP 10, MM 18 may operate under control of an internally generated clock. Bus Clock may be derived from that MM 18 internal clock so that all data transfers through the bus system are synchronized with MM 18's internal clock. In other configurations of DP 10, CPU 16 may provide a clock to MM 18 and Bus Clock may accordingly be provided from, or synchronized with, CPU 16 clock. In yet another example, MM 18 may contain internal microcode circuitry for controlling internal operations and data transfers of MM 18. In this case, MCC 64 would probably derive control inputs from and provide control outputs to MM 18's internal microcode circuitry. In yet another example, MM 18 may be controlled directly or indirectly by CPU 16's internal microcode circuitry and MCC 64's control interface would thus be to CPU 16.

Similarly, the internal structure and operation of MCC 64 will not described herein in detail as design of such control circuitry is well known to those of ordinary skill in the art. The functionality and design requirements of MCC 64's internal circuitry will be apparent to those of ordinary skill in the art after the description of the bus system provided herein.

c. PERIPHERAL CONTROLLER 28 (FIG. 2A)

Referring to PC 28, as shown in FIG. 2A PC 28 is similar in almost all respects to MC 20 and therefore only the differences between a PC 28 and MC 20 will be described herein below.

Referring first to PC 28's interfaces between PCC 66 and HLD line 56, BC line 54, ER line 52, AB line 50, PO line 48, PI line 46, RDY line 44, DI line 40, and ME line 36, PC 28 is similar to MC 20 except that wherein MC 20 contains a line driver or receiver PC 28 contains, respectively, a line receiver or driver. Therefore, PC 28's Hold Driver (HD) 94, Hold Receiver (HR) 96, Clock Receiver (CR) 98, Error Receiver (ER) 100, Abort Driver (AD) 102, Parity Out Receiver (POR) 104, Parity In Driver (PID) 106, Ready Receiver (RR) 108, Data In Driver (DID) 110, Map Enable Driver (MED) 112, and Extended Address Driver (EAD) 114 correspond, respectively, to MC 20's HR 90, HD 88, CD 86, ED 84, AR 82, POD 80, PIR 78, RD 72, DIR 76, MER 74, and EAR 64.

PC 28 also includes a Data Register (DTR) 116, an Address Register (ADR) 118, and an Address/Data Driver/Receiver (A/D/R) 120 which are similar, respectively, to MC 20's DTR 60, ADR 62, and A/D/R 58. The transmission path through PC 28's DTR 116, ADR 118, and A/D/R 120 are indicated by arrows and are similar to those of MC 20 with the exception of ADR 118. In PC 28, addresses are provided to PC 28 by the associated PD 26 and stored therein. In the present embodiment, the basic 16 address bits and 4 extended address bits are uni-directionally transferred from ADR 118 onto, respectively, A/D lines 32 and EA lines 34.

Referring to PC 28's output to WC lines 38, in the present embodiment PC 28 uni-directionally provides a WCN to MC 20 and, unlike MC 20, is not required to generate a succession of MM 18 addresses. As such, PC 28's output to WC lines 38 is comprised only of Word Count Driver (WCD) 122. That is, PC 28 does not include a register/counter similar to WCC 68. In an alternate embodiment of the present invention, wherein the bus system is fully bi-directional, PC 28 would include a word count register similar to WCC 68. PC 28's WCC 68, together with MC 20's WCC 68, WCR 66, and WCD 122, would be bi-directional so that MC 20 could provide addresses to PCs 28. In this alternate embodiment, the operation of ADR 62 and ADR 118 would be similarly modified.

PC 28 includes a Request Driver (RQD) 124 which is connected from an output of PCC 92 to the RQ line 42 associated with that PC 28 and its' associated PD 26. Whenever the PD 26 associated with a PC 28 requires access to MM 18, PC 28 will generate a RQ signal, through RQD 124, on the associated RQ line 42. As described above and described further below, MC 20 may then respond by allowing that associated PD 26 access to MM 18.

Associated with a PC 28's RQD 124 is a Request Priority Gate (RQPG) 126. RQPG 126 is a multi-input gate having an input connected from each RQ line 42 associated with a PD 26 having a higher priority of access to MM 18. Whenever a PD 26 having a higher priority causes a RQ signal to be placed upon its associated RQ line 42, the RQPG 126s of all PC 28s associated with lower priority PD 26s will generate outputs indicating that a higher priority request is present in the bus system. PCC 92 will respond to such as output from RQPG 126 by inhibiting its' request output through RQD 124. RQPG 126's output will also inhibit PC 28's ability to respond to a RDY signal from MC 20 on RDY line 44. This operation insures that only a single RQ signal will be present on a RQ line 42 at any given time, that that RQ signal shall be from the highest priority PD requesting access to MM 18, and that all lower priority PD 26s having a request for access MM 18 will be inhibited from responding to the RDY signal response from MC 20. The response by the highest priority requesting PD 26 to a RDY signal on RDY line 44 is not inhibited, however, so that the highest priority requesting PD 26 will thereby respond to MC 20's RDY signal and initiate data transfer with MM 18.

Referring finally to PCC 92, the statements made above with reference to MCC 64 of MC 20 also apply to the PCC 92 of each PC 28. The primary destinction in this respect between a PCC 92 and MCC 64 is with respect to Bus Clock. All PC 28s of the bus system receive Bus Clock from BC line 54 and their operation is synchronized to Bus Clock. Data transfers between a PC 28 and MM 18 may thereby be completely synchronous with operation of MM 18. In a preferred embodiment of the present invention, PCC 92 of each PC 28 will provide Bus Clock to the associated PD 26, so that operation of the associated PD 26 may be synchronized to Bus Clock. In this case, data transfers are completely synchronous from end to end and are synchronous to Bus Clock.

Figure 3:
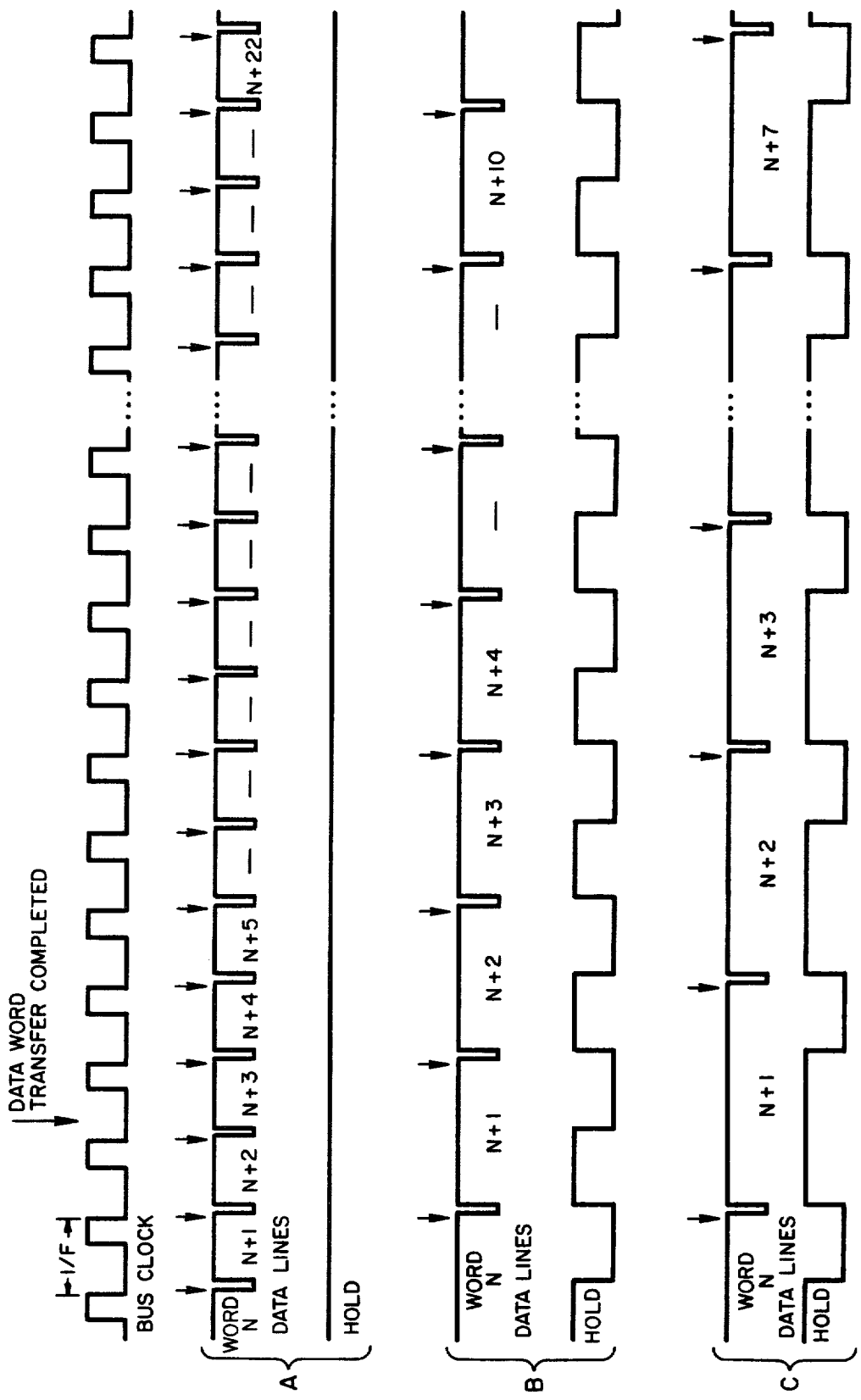
FIG. 3 is a timing diagram illustrating operation of the data bus system of FIG. 2.

Having described the structure and operation of individual elements of the bus system of the present invention, including SYSBUS 14, MC 20, and a PC 28, the overall operation of the system bus will be described and summarized next below.

d. BUS SYSTEM OPERATION (FIGS. 2, 2A, 3)

As described above, whenever a PD 26 requires access to MM 18 that PD 26's associated PC 28 will generate a RQ signal on the associated RQ line 42. If a higher priority PD 26 is concurrently requesting access to MM 18, the request by the lower priority PD 26, and its associated PC 28's response to RDY signals on RDY line 44, will be inhibited. MC 20 will respond to a RQ signal appearing on any RQ line 42 with a RDY signal on RDY line 44 when access to MM 18 is available.

The PC 28 of the highest priority requesting PD 26 will respond to MC 20's RDY signal on RDY line 44 by initiating a data transfer. In the first step, PC 28 will place a control word on SYSBUS 14. A control word includes 16 bits of address on A/D lines 32 and may include 4 bits of extended address on EA lines 34. A control word may also include a WCN on WC lines 38, a ME signal on ME line 36 if mapping is to be performed, and will include a DI signal on DI line 40 indicating in which direction data transfer is to be performed and a parity bit on PI line 46 for error checking.

MC 20 and the PC 28 will then begin data transfer by transferring data words on A/D lines 32 in synchronization with Bus Clock. Each data word will be accompanied by a parity bit on either PI line 46 or PO line 48, depending upon the direction of data transfer.

If data transfer is from a PC 28 to MC 20 and MC 20 indicates a parity error in a received control or data word, MC 20 will assert an ER signal on ER line 52 during a succeeding Bus Clock cycle. The transmitting PC 28 may respond to such an ER signal by terminating the data transmission and concurrently asserting an AB signal on AB line 50. MC 20 responds to an AB signal by immediately terminating the current data transfer. If a parity error is detected in a data transmission from MC 20 to a PC 28, the receiving PC 28 may select to terminate the data transmission by similarly asserting an AB signal.

A single data transfer is thereby comprised of a control word and one or more data words. Each transmission and reception of a control or data word will be executed on a Bus Clock, so that operation of the bus system is synchronous.

As previously described, DP 10 and each PD 26 of the data processing system may have differing data transmission rate capabilities. The period of Bus Clock, however, is preferrably that of the device, either DP 10 or a PD 26, having the highest data rate capability. In most cases, Bus Clock period will be determined by DP 10. Synchronous bus system operation, together with the ability to automatically adjust data transmission rate to that of the slower of a pair of communicating units of the date processing system, is achieved through use of Hold (HLD) signal.

As previously described, a unit receiving a data transmission, either MC 20 or a PC 28, may indicate that it is not yet ready to receive a control or data word placed upon SYSBUS 14 by asserting HLD signal on HLD line 56. The sending unit will respond to HLD signal by maintaining the control or data word currently being transmitted on SYSBUS 14 unit HLD signal is terminated. Completion of transfer of the held control or data word will occur on the next Bus Clock after HLD signal is terminated.

Referring to FIG. 3, operation of MC 20, a PC 28, and HLD signal for varying data rates is illustrated. The top line of FIG. 3 shows Bus Clock having a period of 1/F. The next two lines, Example A, illustrate the operation of the bus system wherein both the transmitting and receiving units have data rate capabilities equal to or greater than Bus Clock. As indicated in Example A, HLD signal is not asserted and a data or control word is transferred upon each Bus Clock pulse.

Referring to the second pair of lines in FIG. 3, Example B, the operation of system bus wherein either the sending or receiving unit has a data rate capability of one half of Bus Clock rate is illustrated. In this example, and referring to the period designated as Word N, HLD signal is asserted during first Bus Clock period and is released at end of that Bus Clock period. Word N, the data control word being transferred, is maintained on SYSBUS 14 by the sending unit during the first and second Bus Clock periods. Transfer of the control or data word is completed at end of second Bus Clock period, and a next data or control word is placed on SYSBUS 14 at start of third Bus Clock period. At start of third Bus Clock period, HLD signal is once again asserted and remains asserted during third Bus Clock period so that transfer of the second word is completed at the end of fourth Bus Clock period, and so on.

Referring to the last two lines of FIG. 3, Example C, a data transfer between a sending and receiving pair wherein the data rate of the slower of the pair is one third of Bus Clock rate is illustrated. Data or control words are transferred at the end of equal time intervals wherein each time interval is equal to three Bus Clock periods, so that data transfer rate is equal to one third of Bus Clock rate. This operation is achieved by asserting HLD signal during the first two Bus Clock periods of each three Bus Clock period interval.

As may be seen by comparing examples A, B and C of FIG. 3, data transmission rate of Example B is one half of that of Example A while data transmission rate in Example C is one third that of Example A. In each case, however, all data transfers are performed synchronously with Bus Clock. Data transfer rate is automatically adjusted by the sending and receiving units to that of the slower of the sending and receiving unit pair through operation of HLD signal.

The invention of the above described bus system thereby allows a fully synchronous data bus with an automatically adaptable and variable data transmission rate. The bus system described above thereby allows data transfers between a sending and receiving unit to be performed at the maximum rate achievable by the units while preserving synchronous operation.

The invention may be embodied in yet other specific forms without departing from the spirit or essential characteristics thereof. For example, the bus system described above may be utilized in data system other than that described herein, that is, whenever transmission of digital data is required. Also, and as described above, the bus system may be modified to be fully bi-directional in both data transfer and addressing. Thus, the present embodiments are to be considered in all respects as illustrative and not restrictive, the scope of the invention being indicated by the appended claims rather than by the foregoing descriptions, and all changes which come within the meaning and range of equivalency of the claims are therefor intended to be embraced therein.

What is claimed is:

1. In a data processing system including processor means for processing said data, main memory means for storing said data, at least one peripheral device means, and bus system means for conducting information including main memory addresses and said data between said main memory means and said at least one peripheral device means, said bus system means comprising:
   bus means, including
      a plurality of address/data lines for conducting said information,
      a clock line for conducting a clock signal, and
      a hold line for conducting a hold signal;
   master controller means, including
      clock means having an output connected to said clock line for providing a clock signal having a fixed clock signal period,
      master register means connected between said address/data lines and said main memory means and responsive to said clock signal for storing and transferring said information between said address/data lines and said main memory means in synchronization with said clock signal, and
      master hold control means having an output connected to and an input connected from said hold line, and
         (a) responsive to operation of said main memory means for providing said hold signal on said hold line during each said fixed clock signal period wherein said main memory means is not ready to receive said information provided on said address/data lines by said peripheral device means, and
         (b) responsive to said hold signal provided on said hold line during a said fixed clock signal period by a peripheral controller means associated with said peripheral device means for providing control signals to said master controller means and said main memory means to maintain said information stored in said master register means for transfer to said peripheral device means on said address/data lines during said fixed clock signal period; and
   said peripheral controller means associated with each one of said peripheral device means, each one of said peripheral controller means including
      peripheral register means connected between said address/data lines and said associated peripheral device means and responsive to said clock signal on said clock line for storing and transferring said information between said address/data lines and said associated peripheral device means in synchronization with said clock signal, and
      peripheral hold control means having an input connected from and an output connected to said hold line, and
         (a) responsive to operation of said associated peripheral device means for providing a hold signal on said hold line during each said clock signal period wherein said peripheral device means is not ready to receive said information provided on said address/data lines by said master controller means, and
         (b) responsive to said hold signal provided on said hold line by said master controller means during said fixed clock signal period for providing control signals to said associated peripheral device means and to said peripheral controller means to maintain said information stored in said peripheral register means for transfer to said master controller means on said address/data lines during said fixed clock signal period.

2. The bus system means of claim 1, wherein
said bus means further includes
- a plurality of request lines, each one of said request lines being associated with a corresponding different one of said peripheral device means, for conducting request signals from said associated peripheral controller means of said corresponding peripheral device means to said master controller means when a said associated one of the corresponding peripheral device means requires access to said main memory means, and
- a ready line for conducting a ready signal from said master controller means to each one of said associated peripheral controller means;

said master controller means further includes
- request response means responsive to each one of said request signals appearing on each one of said request lines and to operation of said main memory means for providing a ready signal on said ready line when said main memory means is available for transfer of said information between said main memory means and a said one of said peripheral device means requesting access to said main memory means; and, each one of said associated peripheral controller means further includes
- request generator means having an output connected to the correspondingly associated request line of its associated peripheral device means and responsive to operation of its associated peripheral device means for providing a request signal on said correspondingly associated request line of its peripheral device means when its associated peripheral device means requires access to said main memory means,
- request priority means having inputs connected from each one of said request lines and responsive to said request signals provided thereupon by others of said peripheral controllers associated with others of said peripheral device means for inhibiting a request for access to said main memory means by said respectively associated peripheral device means when one of said others of said peripheral device means of a higher priority is requesting access to said main memory means, and
- transfer control means responsive to said ready signal and to operation of said request priority means for providing control signals initiating said transfer of said information between said associated peripheral device means said main memory means when said associated peripheral device means has the highest priority of said peripheral device means requesting access to said main memory means.

3. The bus system of claim 2, wherein
said information is transferred between said main memory means and said peripheral device means organized as words, each one of said words containing a uniform number of information bits and a single transfer of said information comprising transfer of an integral number not less than one of said words;

said bus means further includes a plurality of word count lines for conducting word count numbers representing the number of words to be transferred between a said peripheral device means and said main memory means in a said single transfer of said information;

said peripheral register means of each said peripheral controller means associated with a said peripheral device means includes
- peripheral start address register means connected from said associated peripheral device means and to said address/data lines for storing and transferring to said address/data lines a starting address representing the location in said main memory means of the first one of said words to be transferred, and
- peripheral word count register means connected from said associated peripheral device means and to said word count lines for storing and transferring to said word count lines a said word count number representing a said number of words to be transferred;

said master register means includes
- master start address means connected from said address/data lines for storing and transferring to said main memory means said starting address, and
- master word count register means connected from said word count lines for receiving and storing said word count number; and said master controller further includes address control means responsive to said word count number stored in said master word count register means and to said clock and hold signals for providing control signals to said master start address register means to successively increment said address stored therein so that said master start address register means provides to said memory means successive addresses representing successive locations in said memory means as corresponding successive said words are transferred between said main memory means and said peripheral device means.

4. The bus system means of claim 3, wherein
said bus means further includes
- parity line means connected between said master controller means and each one of said peripheral device means for conducting parity signals relating to said information present on said address/data lines,
- an error line for conducting an error signal from said master controller means to each one of said peripheral device means, and
- an abort line for conducting an abort signal from each one of said peripheral device means to said master controller means;

said master controller means further includes
parity means
- (a) responsive to said information to be transferred from said master controller means to one of said peripheral device means for providing on said parity line means parity signals relating to said information to be transferred, and
- (b) responsive to said information and said related parity signals received on said address/data lines and said parity line means from each one of said peripheral device means for providing a said error signal on said error line when a parity error is present in said received information, and abort control means responsive to an abort signal provided on said abort line by one of said peripheral device means for providing control signals to said master controller means and to said processor means for terminating a current transfer of said information; and each one of said peripheral controller means further includes parity means responsive to said information to be transferred from said associated peripheral device means to said master controller means for providing on said parity line means parity signals relating to said information to be transferred, and abort means responsive to said information and said parity signals received from said master controller means on said address/data lines and said parity line means for indicating when a parity error is present in said received information and for selectively providing control signals to said peripheral device means and a said abort signal to said abort line for terminating a current transfer of said information.

5. The bus system means of claim 1, wherein said bus means further includes parity line means connected between said master controller means and each one of said peripheral device means for conducting parity signals relating to said information present on said address/data lines, an error line for conducting an error signal from said master controller means to each one of said peripheral device means, and an abort line for conducting an abort signal from each one of said peripheral device means to said master controller means;

said master controller means further includes parity means (a) responsive to said information to be transferred from said master controller means to one of said peripheral device means for providing on said parity line means parity signals relating to said information to be transferred, and (b) responsive to said information and said related parity signals received on said address/data lines and said parity line means from each one of said peripheral device means for providing a said error signal on said error line when a parity error is present in said received information, and abort control means responsive to an abort signal provided on said abort line by one of said peripheral device means for providing control signals to said master controller means and to said processor means for terminating a current transfer of said information; and each one of said peripheral controller means further includes parity means responsive to said information to be transferred from said associated peripheral device means to said master controller means for providing on said parity line means parity signals relating to said information to be transferred, and abort means responsive to said information and said parity signals received from said master controller means on said address/data lines and said parity line means for indicating when a parity error is present in said received information and for selectively providing control signals to said peripheral device means and a said abort signal to said abort line for terminating a current transfer of said information.

6. The bus system means of claim 5, wherein said bus means further includes a plurality of request lines, each one of said request lines being associated with a corresponding different one of said peripheral device means, for conducting request signals from said associated peripheral controller means of said corresponding peripheral device means to said master controller means when a said associated one of the corresponding peripheral device means requires access to said main memory means, and a ready line for conducting a ready signal from said master controller means to each one of said associated peripheral controller means;

said master controller means further includes request response means responsive to each one of said request signals appearing on each one of said request lines and to operation to said main memory means for providing a ready signal on said ready line when said main memory means is available for transfer of said information between said main memory means and a said one of said peripheral device means requesting access to said main memory means; and, each one of said associated peripheral controller means further includes request generator means having an output connected to the correspondingly associated request line of its associated peripheral device means and responsive to operation of its associated peripheral device means for providing a request signal on said correspondingly associated request line of its peripheral device means when its associated peripheral device means requires access to said main memory means, request priority means having inputs connected from each one of said request lines and responsive to said request signals provided thereupon by others of said peripheral controllers associated with others of said peripheral device means for inhibiting a request for access to said main memory means by said respectively associated peripheral device means when one of said others of said peripheral device means of a higher priority is requesting access to said main memory means, and transfer control means responsive to said ready signal and to operation of said request priority means for providing control signals initiating said transfer of said information between said associated peripheral device means said main memory means when said associated peripheral device means has the highest priority of said peripheral device means requesting access to said main memory means.

* * * * *